US006802022B1

(12) United States Patent
Olson

(10) Patent No.: US 6,802,022 B1
(45) Date of Patent: Oct. 5, 2004

(54) MAINTENANCE OF CONSISTENT, REDUNDANT MASS STORAGE IMAGES

(75) Inventor: Thomas M. Olson, Westborough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 603 days.

(21) Appl. No.: 09/664,483

(22) Filed: Sep. 18, 2000

Related U.S. Application Data

(63) Continuation-in-part of application No. 09/550,108, filed on Apr. 14, 2000.

(51) Int. Cl.[7] ................................................ G06F 11/00
(52) U.S. Cl. ........................................... 714/6; 711/113
(58) Field of Search ............................ 714/6, 7, 13, 11, 714/5, 42, 43, 47, 15, 54; 711/113, 114, 133, 159

(56) References Cited

U.S. PATENT DOCUMENTS

| | | | | |
|---|---|---|---|---|
| 3,460,094 A | 8/1969 | Pryor | ...................... | 340/172.5 |
| 3,469,239 A | 9/1969 | Richmond et al. | ....... | 340/172.3 |
| 3,544,973 A | 12/1970 | Borck, Jr. et al. | ....... | 340/172.5 |
| 3,548,382 A | 12/1970 | Lichty et al. | ............ | 340/172.5 |
| 3,609,704 A | 9/1971 | Schurter | ................... | 340/172.5 |

(List continued on next page.)

FOREIGN PATENT DOCUMENTS

| | | | | |
|---|---|---|---|---|
| EP | 0 208 430 | 1/1987 | ........... | G06F/13/32 |
| EP | 0 406 759 A3 | 1/1991 | ........... | H04L/12/56 |
| EP | 0 428 330 A3 | 5/1991 | ........... | G06F/13/30 |
| EP | 0 461924 A2 | 12/1991 | | |
| EP | 0 483978 A2 | 5/1992 | | |
| EP | 0 488 366 A2 | 6/1992 | ........... | G11C/16/06 |
| EP | 0 488366 A3 | 6/1992 | ........... | G11C/16/06 |
| EP | 0 642079 A1 | 3/1995 | ........... | G06F/11/14 |
| EP | 0 475 005 B1 | 11/1995 | ........... | G06F/15/16 |
| EP | 0 772136 A3 | 5/1997 | ........... | G06F/17/00 |
| EP | 0 772136 A2 | 5/1997 | ........... | G06F/17/00 |
| EP | 0 790 558 A1 | 8/1997 | | |
| EP | 0 390 567 B1 | 6/1999 | ........... | H04L/29/06 |
| FR | 2 508 200 | 12/1982 | ........... | G06F/13/00 |
| WO | 95/12848 | 5/1995 | ........... | G06F/11/00 |
| WO | WO 95/12848 A1 | 5/1995 | | |

OTHER PUBLICATIONS

Form PCT/ISA/210, International Search Report for International Application No. PCT/US01/12138, mailed on Mar. 26, 2002.

(List continued on next page.)

Primary Examiner—Nadeem Iqbal
(74) Attorney, Agent, or Firm—John D. Lanza, Esq.; Lahive & Cockfield

(57) ABSTRACT

Methods and apparatus for providing improved maintenance of consistent, redundant mass storage images. In one embodiment, one feature of the invention is the presence of non-volatile storage and persistent volatile memory, where the persistent volatile memory is used to store write transactions posted to non-volatile storage. Another feature of the invention is an intermediary program, such as a device driver, that serves as an intermediary between the operating system and non-volatile storage that processes write requests from the operating system directed to non-volatile storage, stores their contents in persistent volatile memory, and then completes the write to non-volatile storage. Yet another feature of the invention is that the contents of the persistent memory region are resistant to initialization or modification during a boot cycle. Another feature of the invention is that the intermediary program processes write requests atomically, preventing the results of incomplete or partial transactions from subsequent loading from the persistent memory region by computer applications.

12 Claims, 6 Drawing Sheets

U.S. PATENT DOCUMENTS

| | | | |
|---|---|---|---|
| 3,641,505 A | 2/1972 | Artz et al. | 340/172.5 |
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 |
| 3,893,084 A | 7/1975 | Kotok et al. | 340/172.5 |
| 4,015,246 A | 3/1977 | Hopkins, Jr. et al. | 340/172.5 |
| 4,040,034 A | 8/1977 | Belady et al. | 364/200 |
| 4,096,572 A | 6/1978 | Namimoto | 364/200 |
| 4,164,787 A | 8/1979 | Aranguren | 364/200 |
| 4,228,496 A | 10/1980 | Katzman et al. | 364/200 |
| 4,296,463 A | 10/1981 | Dalboussiere et al. | 364/200 |
| 4,356,550 A | 10/1982 | Katzman et al. | 364/200 |
| 4,365,295 A | 12/1982 | Katzman et al. | 364/200 |
| 4,366,535 A | 12/1982 | Cedolin et al. | 364/200 |
| 4,466,098 A | 8/1984 | Southard | 371/9 |
| 4,484,273 A | 11/1984 | Stiffler et al. | 364/200 |
| 4,493,036 A | 1/1985 | Boudreau et al. | 364/200 |
| 4,503,499 A | 3/1985 | Mason et al. | 364/200 |
| 4,562,575 A | 12/1985 | Townsend | 371/9 |
| 4,574,348 A | 3/1986 | Scallon | 364/200 |
| 4,589,066 A | 5/1986 | Lam et al. | 364/200 |
| 4,590,554 A | 5/1986 | Glazer et al. | 364/200 |
| 4,608,631 A | 8/1986 | Stiffler et al. | 364/200 |
| 4,608,688 A | 8/1986 | Hansen et al. | 371/11 |
| 4,622,667 A | 11/1986 | Yount | 371/9 |
| 4,637,024 A | 1/1987 | Dixon et al. | 371/67 |
| 4,648,031 A | 3/1987 | Jenner | 364/200 |
| 4,672,613 A | 6/1987 | Foxworthy et al. | 371/38 |
| 4,674,037 A | 6/1987 | Funabashi et al. | 364/200 |
| 4,677,546 A | 6/1987 | Freeman et al. | 364/200 |
| 4,695,975 A | 9/1987 | Bedrij | 364/900 |
| 4,700,292 A | 10/1987 | Campanini | 364/200 |
| 4,716,523 A | 12/1987 | Burrus, Jr. et al. | 364/200 |
| 4,719,568 A | 1/1988 | Carrubba et al. | 364/200 |
| 4,774,659 A | 9/1988 | Smith et al. | 364/200 |
| 4,866,604 A | 9/1989 | Reid | 364/200 |
| 4,924,427 A | 5/1990 | Savage et al. | 364/900 |
| 4,942,517 A | 7/1990 | Cok | 364/200 |
| 4,942,519 A | 7/1990 | Nakayama | 364/200 |
| 4,965,717 A | 10/1990 | Cutts, Jr. et al. | 364/200 |
| 4,993,030 A | 2/1991 | Krakauer et al. | 371/40.1 |
| 5,115,490 A | 5/1992 | Komuro et al. | 395/400 |
| 5,155,809 A | 10/1992 | Baker et al. | 395/200 |
| 5,155,844 A | 10/1992 | Cheng et al. | 395/575 |
| 5,157,663 A | 10/1992 | Major et al. | 371/9.1 |
| 5,175,855 A | 12/1992 | Putnam et al. | 395/700 |
| 5,193,162 A | 3/1993 | Bordsen et al. | 395/425 |
| 5,193,180 A | 3/1993 | Hastings | 395/575 |
| 5,195,040 A | 3/1993 | Goldsmith | 364/443 |
| 5,231,640 A | 7/1993 | Hanson et al. | 371/68.3 |
| 5,255,367 A | 10/1993 | Bruckert et al. | 395/200 |
| 5,276,860 A | 1/1994 | Fortier et al. | 395/575 |
| 5,280,612 A | 1/1994 | Lorie et al. | 395/600 |
| 5,280,619 A | 1/1994 | Wang | 395/725 |
| 5,295,258 A | 3/1994 | Jewett et al. | 395/575 |
| 5,317,726 A | 5/1994 | Horst | 395/575 |
| 5,317,752 A | 5/1994 | Jewett et al. | 395/750 |
| 5,321,706 A | 6/1994 | Holm et al. | 371/51.1 |
| 5,333,265 A | 7/1994 | Orimo et al. | 395/200 |
| 5,333,303 A | 7/1994 | Mohan | 395/575 |
| 5,335,334 A | 8/1994 | Takahashi et al. | 395/425 |
| 5,357,612 A | 10/1994 | Alaiwan | 395/200 |
| 5,359,713 A * | 10/1994 | Moran et al. | 710/52 |
| 5,383,161 A | 1/1995 | Sanemitsu | 365/230.06 |
| 5,386,524 A | 1/1995 | Lary et al. | 395/400 |
| 5,404,361 A | 4/1995 | Casorso et al. | 371/40.1 |
| 5,423,037 A | 6/1995 | Hvasshovd | 395/600 |
| 5,423,046 A | 6/1995 | Nunnelley et al. | 395/750 |
| 5,426,747 A | 6/1995 | Weinreb et al. | 395/400 |
| 5,440,710 A | 8/1995 | Richter et al. | 395/417 |
| 5,440,727 A | 8/1995 | Bhide et al. | 395/444 |
| 5,440,732 A | 8/1995 | Lomet et al. | 395/600 |
| 5,463,755 A | 10/1995 | Dumarot et al. | 395/475 |
| 5,465,328 A | 11/1995 | Dievendorff et al. | 395/182.13 |
| 5,475,860 A | 12/1995 | Ellison et al. | 395/846 |
| 5,497,476 A | 3/1996 | Oldfield et al. | 395/439 |
| 5,504,873 A | 4/1996 | Martin et al. | 395/438 |
| 5,513,314 A | 4/1996 | Kandasamy et al. | 395/182.04 |
| 5,550,986 A | 8/1996 | DuLac | 395/280 |
| 5,555,404 A | 9/1996 | Torbjørnsen et al. | 395/600 |
| 5,557,770 A | 9/1996 | Bhide et al. | 395/488 |
| 5,566,316 A | 10/1996 | Fechner et al. | 395/441 |
| 5,568,629 A | 10/1996 | Gentry et al. | 395/441 |
| 5,581,750 A | 12/1996 | Haderle et al. | 395/618 |
| 5,584,008 A | 12/1996 | Shimada et al. | 395/441 |
| 5,584,018 A | 12/1996 | Kamiyama | 395/492 |
| 5,586,253 A | 12/1996 | Green et al. | 395/411 |
| 5,586,291 A * | 12/1996 | Lasker et al. | 711/113 |
| 5,586,310 A | 12/1996 | Sharman | 395/600 |
| 5,606,681 A | 2/1997 | Smith et al. | 395/413 |
| 5,619,671 A | 4/1997 | Bryant et al. | 395/412 |
| 5,627,961 A | 5/1997 | Sharman | 395/182.04 |
| 5,628,023 A | 5/1997 | Bryant et al. | 395/800 |
| 5,632,031 A | 5/1997 | Velissaropoulos et al. | 395/611 |
| 5,651,139 A | 7/1997 | Cripe et al. | 395/490 |
| 5,664,172 A | 9/1997 | Antoshenkov | 395/604 |
| 5,682,513 A | 10/1997 | Candelaria et al. | 395/440 |
| 5,687,392 A | 11/1997 | Radko | 395/842 |
| 5,694,583 A | 12/1997 | Williams et al. | 395/500 |
| 5,720,027 A * | 2/1998 | Sarkozy et al. | 714/6 |
| 5,721,918 A | 2/1998 | Nilsson et al. | 395/618 |
| 5,724,501 A | 3/1998 | Dewey et al. | 395/182.07 |
| 5,724,581 A | 3/1998 | Kozakura | 395/618 |
| 5,742,792 A | 4/1998 | Yanai et al. | 395/489 |
| 5,754,821 A | 5/1998 | Cripe et al. | 395/491 |
| 5,794,035 A | 8/1998 | Golub et al. | 395/674 |
| 5,794,252 A | 8/1998 | Bailey et al. | 707/202 |
| 5,799,324 A | 8/1998 | McNutt et al. | 707/206 |
| 5,815,649 A | 9/1998 | Utter et al. | 395/112.04 |
| 5,819,109 A * | 10/1998 | Davis | 710/15 |
| 5,838,894 A | 11/1998 | Horst | 395/182.09 |
| 5,838,899 A | 11/1998 | Leavitt et al. | 395/185.09 |
| 5,862,145 A | 1/1999 | Grossman et al. | 371/5.1 |
| 5,875,465 A | 2/1999 | Kilpatrick et al. | 711/134 |
| 5,889,935 A | 3/1999 | Ofek et al. | 395/182.04 |
| 5,892,928 A | 4/1999 | Wallach et al. | 395/283 |
| 5,894,560 A | 4/1999 | Carmichael et al. | 395/845 |
| 5,898,869 A | 4/1999 | Anderson | 713/2 |
| 5,918,229 A | 6/1999 | Davis et al. | 707/10 |
| 5,933,838 A | 8/1999 | Lomet | 707/202 |
| 5,953,538 A | 9/1999 | Duncan et al. | 395/842 |
| 5,953,742 A | 9/1999 | Williams | 711/154 |
| 5,956,756 A | 9/1999 | Khalidi et al. | 711/207 |
| 5,990,914 A | 11/1999 | Horan et al. | 345/521 |
| 6,012,106 A | 1/2000 | Schumann et al. | 710/22 |
| 6,012,120 A | 1/2000 | Duncan et al. | 710/22 |
| 6,016,495 A | 1/2000 | McKeehan et al. | 707/103 |
| 6,021,456 A | 2/2000 | Herdeg et al. | 710/260 |
| 6,032,227 A | 2/2000 | Shaheen et al. | 711/129 |
| 6,047,343 A | 4/2000 | Olarig | 710/102 |
| 6,065,017 A | 5/2000 | Barker | 707/202 |
| 6,067,550 A | 5/2000 | Lomet | 707/202 |
| 6,085,200 A | 7/2000 | Hill et al. | 707/202 |
| 6,098,137 A | 8/2000 | Goodrum et al. | 710/129 |
| 6,105,075 A | 8/2000 | Ghaffari | 710/5 |
| 6,119,128 A | 9/2000 | Courter et al. | 707/202 |
| 6,119,244 A * | 9/2000 | Schoenthal et al. | 714/4 |
| 6,128,711 A | 10/2000 | Duncan et al. | 711/155 |
| 6,138,198 A | 10/2000 | Garnett et al. | 710/129 |

| | | |
|---|---|---|
| 6,141,722 A | 10/2000 | Parsons ......................... 711/2 |
| 6,141,744 A | 10/2000 | Wing So ...................... 712/35 |
| 6,181,614 B1 * | 1/2001 | Aipperspach et al. ....... 365/200 |
| 6,397,293 B2 * | 5/2002 | Shrader et al. ............. 711/114 |
| 6,434,695 B1 | 8/2002 | Esfahani et al. ............... 713/2 |
| 6,496,942 B1 * | 12/2002 | Schoenthal et al. ............ 714/4 |
| 6,507,906 B1 | 1/2003 | Criddle et al. ................. 713/2 |
| 6,542,967 B1 | 4/2003 | Major ........................ 711/134 |
| 6,636,963 B1 | 10/2003 | Stein et al. .................... 713/2 |
| 2002/0124040 A1 | 9/2002 | Foster et al. ................ 709/100 |

OTHER PUBLICATIONS

Ng et al., "*The Systematic Improvement of Fault Tolerance in the Rio File Cache*"; Proceedings of the 1999 Symposium on Fault–Tolerant Computing (FTCS).

Chen et al., "*The Rio File Cache: Surviving Operating System Crashes*"; University of Michigan, Department of Electrical Engineering and Computer Science, pp 1–11.

Nørv g, K. "The vagabond temporal OID index: an index structure for OID indexing in temporal object database systems." *2000 International Database Engineering and Applications Symposium* pp. 158–1666 (2000).

Form PCT/ISA/210 Patent Cooperation Treaty International Search Report to International Application No.: PCT/US02/11485 mailed on Jul. 21, 2003.

Annex to Form PCT/ISA/206 Communication Relating to the Results of the Partial International Search to International Application No.: PCT/US 01/12138 mailed on Nov. 27, 2000.

"Dynamic Scatter Gather Table", IBM Technical Disclosure Bulletin, pp. 1–2 (Aug. 1990).

\* cited by examiner

US 6,802,022 B1

MAINTENANCE OF CONSISTENT, REDUNDANT MASS STORAGE IMAGES

CROSS-REFERENCE TO RELATED APPLICATIONS

This application is a continuation-in-part of U.S. patent application Ser. No. 09/550,108, filed Apr. 14, 2000.

FIELD OF THE INVENTION

The present invention relates to preserving the contents of non-volatile storage and, in particular, to preserving the contents of a non-volatile storage during a system failure.

BACKGROUND OF THE INVENTION

Prior art computer systems typically include a volatile memory for the storage and manipulation of information by an operating system and various software applications, and a non-volatile memory for mass storage of data and computer programs. When software applications behave in unexpected ways, they can cause the operating system to fail in catastrophic ways, referred to colloquially as a "system crash." When a system crashes, there is no guarantee that the information stored in volatile memory can be salvaged. Moreover, there is a significant chance that the computer system will be interrupted while writing information to non-volatile mass storage, damaging or corrupting the contents of the non-volatile memory.

Typically, the user remedies the system crash by resetting the system. In the resulting boot cycle the operating system typically loses the ability to reference the information contained in the volatile memory or actually initializes the volatile memory, changing or destroying its contents. Similarly, a reboot operation typically destroys the information the computer would need to verify or repair the contents of the non-volatile memory.

Prior art solutions addressing the loss of the contents of volatile memory have taken various approaches. One approach requires a user manually to direct applications to save the contents of volatile memory to a non-volatile memory when significant amounts of information have been processed in volatile memory. An incremental improvement over this approach takes the form of modifications to the software applications themselves, whereupon they save the contents of volatile memory to a non-volatile memory when certain criteria are met. For example, the word processing program Microsoft Word™ from Microsoft Corporation, Redmond, Wash. has an option that automatically saves the contents of documents upon the elapse of a time period selected by the user.

These prior art systems have several failings. First, a failure in the operating system may prevent the functioning of any application-level safeguards. Second, safeguards that rely on regular human intervention are subject to human failings, such as when humans forget to invoke them. Third, safeguards that attempt to substitute application-administered criteria for human judgment and invocation fail in that they cannot guarantee that critical information would be saved when a human user would have chosen to save it.

A second set of prior art solutions to this problem has focused on hardware modifications to preserve the contents of volatile memory during a crash. Some prior art systems are arranged such that every read or write request to an operating system is simultaneously routed to a non-volatile memory. Such a system guarantees a record of memory contents that can be reconstructed during a boot cycle, but suffers from slowness during normal operation, because each transaction is conducted twice, and slowness during a boot cycle, because the operating system must locate the non-volatile record of transactions and reload them. Other prior art systems attempt the same techniques and suffer from the same problems, but reduce the magnitude of the delays by greater selectivity in the transactions actually recorded, or recording transactions in a way that is more amenable to reconstruction. Other prior art systems relying on hardware modification use non-volatile memories, such as electrically erasable programmable read-only memories (EEPROMs), Flash ROM, or battery-backed random-access memory. These systems have several drawbacks, including higher prices than normal volatile memories and the requirement of additional hardware. For example, Flash ROM often requires a charge pump to achieve the higher voltages needed to write to the memory, and suffers a shorter life than normal volatile RAM because of this process. Battery-backed RAMs rely on batteries that are subject to catastrophic failure or charge depletion.

Prior art solutions addressing the integrity of the contents of non-volatile memory have taken several forms. One solution involves equipping the computer with an array of inexpensive mass storage devices (a RAID array, where RAID is an acronym for "redundant array of inexpensive disks"). The computer processes each write transaction to non-volatile storage in parallel, writing it to each device in the array. If the computer fails, then the non-volatile storage device with the most accurate set of contents available can be used as a master, copying all its contents to the other devices in the array (RAID level 1). Another solution only stores one copy of the transaction information across multiple mass storage devices, but also stores parity information concerning the transaction data (RAID level 5).

A computer whose information is stored in a volatile memory resistant to loss or corruption resulting from system or application crashes would avoid the problems associated with the loss and recreation of data. A computer that used this persistent volatile memory to store write transactions directed to non-volatile storage would similarly avoid wholesale duplication. The elimination of time-consuming data reconstruction would help make possible a fault-tolerant computer that offered continuous availability. The present invention provides those benefits.

SUMMARY OF THE INVENTION

The present invention relates to methods and apparatus for providing improved maintenance of consistent, redundant mass storage images. One object of the invention is to store the contents of write transactions to non-volatile storage in a region of volatile memory whose contents are resistant to loss or corruption from system or application crashes and the ensuing reboot cycle, where they are used to repair and complete the contents of the non-volatile storage devices. Another object of the invention is to avoid wholesale copying of contents between non-volatile storage devices.

In one embodiment, one feature of the invention is the presence of non-volatile storage and persistent volatile memory, where the persistent volatile memory is used to store write transactions posted to non-volatile storage. Another feature of the invention is an intermediary program, such as a device driver, that serves as an intermediary between the operating system and non-volatile storage that processes write requests from the operating system directed to non-volatile storage, stores their contents in persistent volatile memory, and then completes the write to non-volatile storage. Yet another feature of the invention is that the contents of the persistent memory region are resistant to initialization or modification during a boot cycle. Another feature of the invention is that the intermediary program processes write requests atomically, preventing the results of incomplete or partial transactions from subsequent loading from the persistent memory region by computer applications.

In another embodiment, one feature of the invention is a computer program that receives write transactions directed to non-volatile storage by the operating system, stores the contents of the write transaction in persistent volatile memory, and then completes the write to non-volatile storage. Another feature of the invention is the marking of transactions in persistent volatile memory as "complete" or "in progress" for use during the reboot and recovery process.

In yet another embodiment, the invention is a method providing improved recovery from system failures. One feature is that the method receives a write transaction from the operating system, stores the contents of the write transaction in persistent volatile memory, and then stores the contents of the write transaction in non-volatile storage. Another feature of the invention is the marking of transactions in persistent volatile memory as "complete" or "in progress" for use during the reboot and recovery process. Yet another feature of the invention is the selection of those write transactions in persistent volatile memory marked "in progress", copying the contents of the uncompleted write transactions from the persistent volatile memory to the non-volatile storage, and then marking the uncompleted write transactions as completed after the successful completion of the copy to non-volatile storage.

BRIEF DESCRIPTION OF THE DRAWINGS

These and other advantages of the invention may be more clearly understood with reference to the specification and the drawings, in which.

In the drawings, like reference characters generally refer to the same parts throughout the different views. Also, the drawings are not necessarily to scale, emphasis instead being placed upon illustrating the principles of the invention.

DETAILED DESCRIPTION OF THE INVENTION

Figure 1:
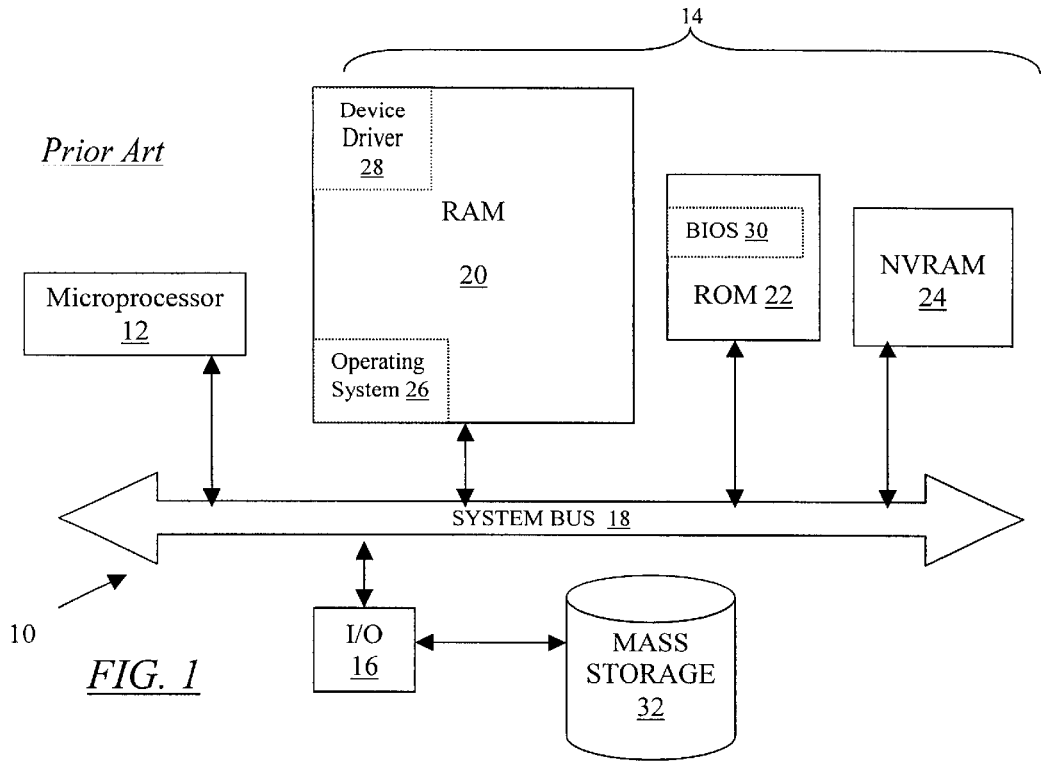
FIG. 1 is a block diagram of an embodiment of a computer known to the prior art.

Referring to FIG. 1, a computer 10 known to the prior art typically includes a microprocessor 12, a memory 14 for storing programs and/or data, an input/output (I/O) controller 16, and a system bus 18 allowing communication among these components. The memory 14 in such a computer typically includes random-access memory (RAM) 20, read-only memory (ROM) 22, and non-volatile random-access memory (NVRAM) 24. The RAM 20 typically contains an operating system 26 and one or more device drivers 28 that permit access to various peripherals by the operating system 26. The ROM 22 typically contains a basic input-output system (BIOS) 30 that handles the boot process of the computer 10. One or more input devices, such as an alphanumeric keyboard or a mouse, and one or more output devices, such as a display or a printer, are also typically included in the computer 10. In some embodiments the computer 10 will also include a network connection. The computer 10 typically has a mass storage device 32 such as a magnetic disk or magneto-optical drive. In particular, some computers 10 have redundant arrays of inexpensive disks (RAID arrays) used as failure-tolerant mass storage 32.

In brief overview, applicant's invention provides a persistent volatile memory in a computer while avoiding the failings of the prior art. This is achieved by partitioning the volatile computer memory into two regions: a non-persistent memory region that is directly accessible to the operating system and typically is initialized or modified during a boot cycle, and a persistent memory region whose contents are not initialized or modified during a boot cycle. In one embodiment, the operating system can indirectly access this persistent memory region through an intermediary program such as a device driver. In another embodiment, the intermediary program invokes operating-system level functionality to enable the operating system to access this persistent memory region only after the boot cycle is completed. This invention is particularly useful in a system-critical fault-tolerant computer that offers continuous availability. Of course, it is to be understood that the invention may include multiple persistent and non-persistent memory regions. For simplicity of explanation and depiction, the following discussion assumes two memory regions, one persistent and one non-persistent. Further, the invention would work equivalently if two independent memory units were used instead of two regions of one memory. Thus, when memory regions are discussed, equivalent descriptions apply for two independent memory units.

Figure 2:
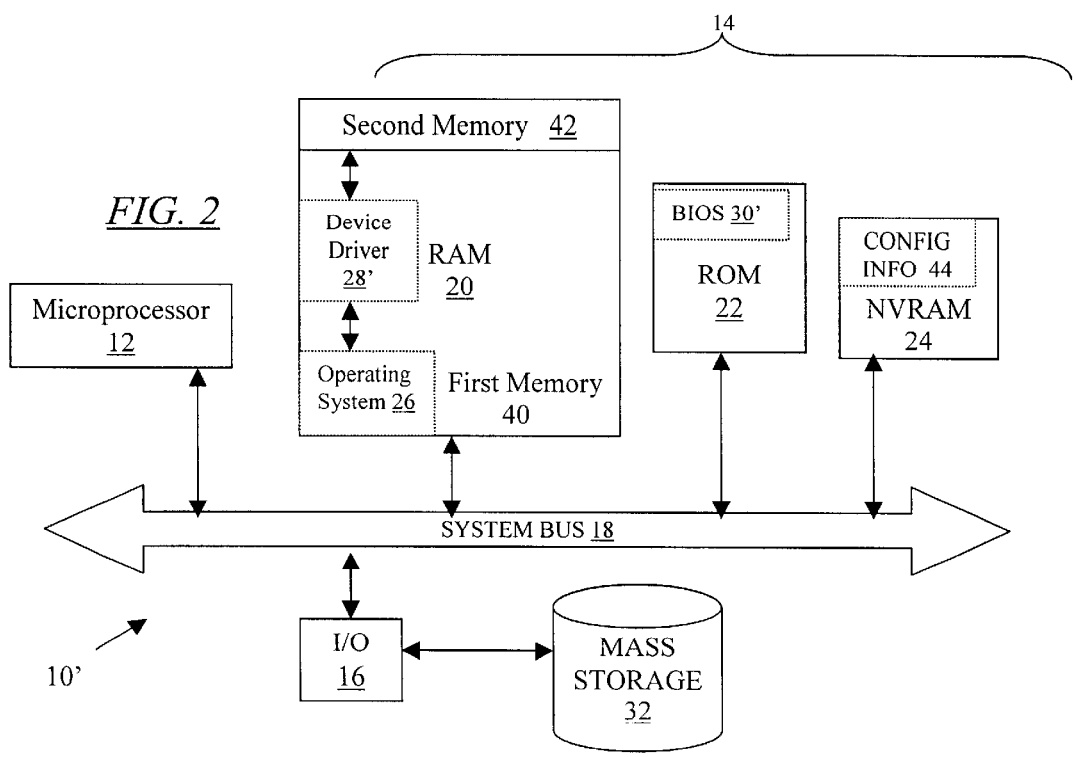
FIG. 2 is a block diagram of an embodiment of a computer constructed in accordance with the present invention.
Figure 3:
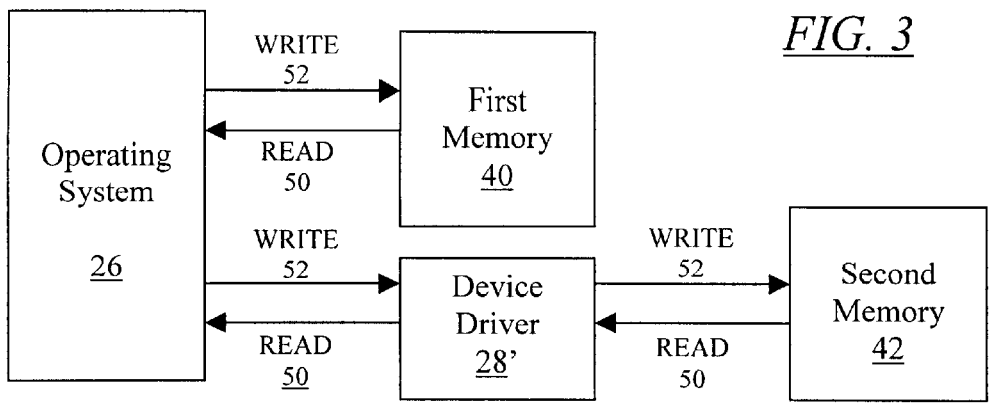
FIG. 3 is a functional block diagram of the embodiment of the present invention depicted in FIG. 2.
Figure 4:
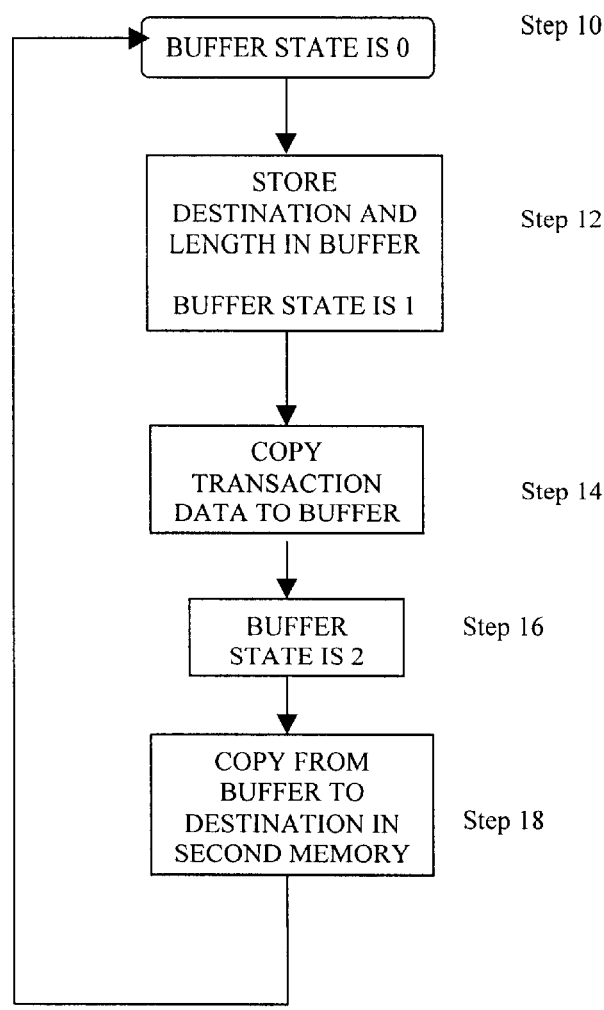
FIG. 4 is a flowchart depicting the state of a look-ahead buffer while processing a write request atomically in accord with the present invention.
Figure 5:
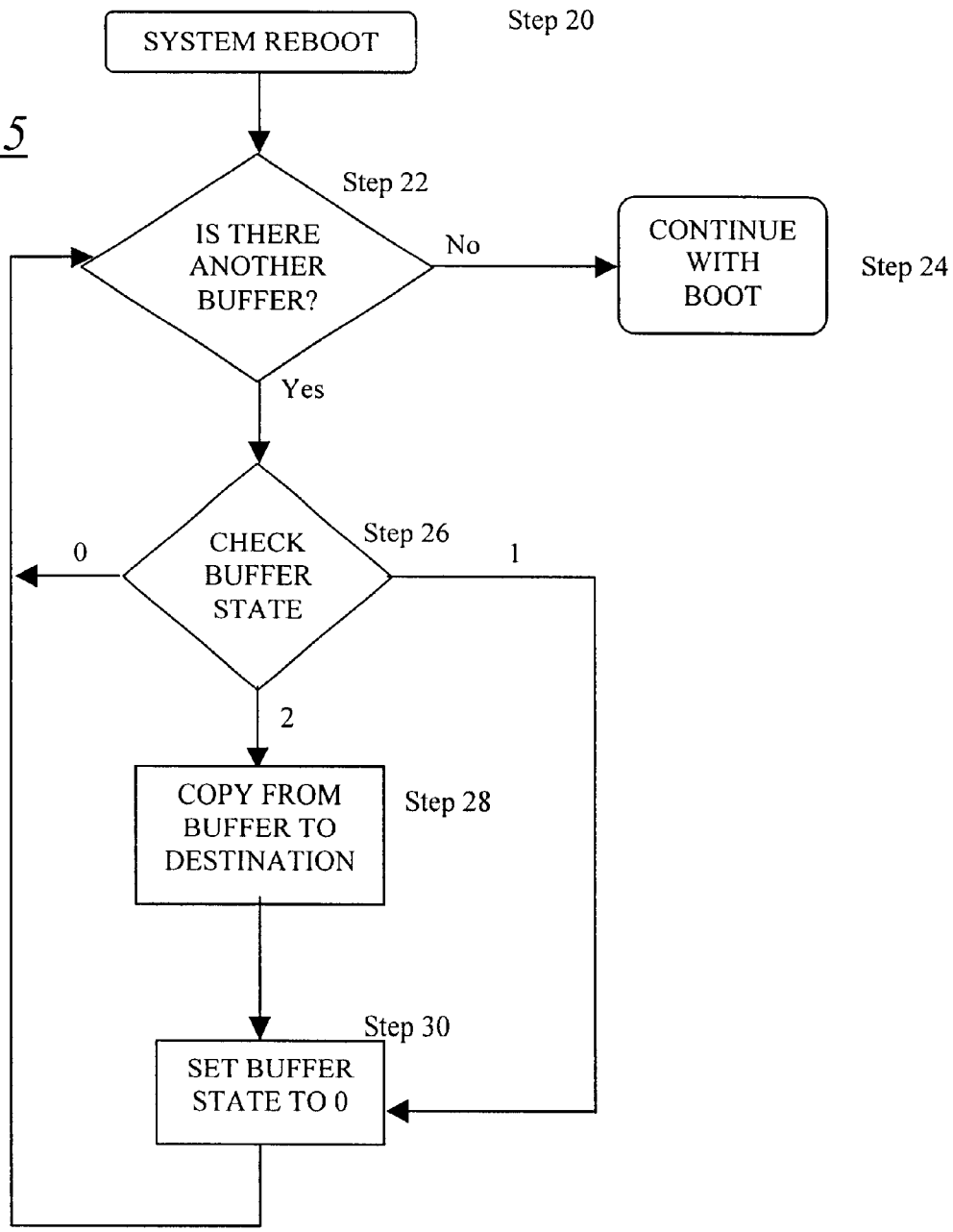
FIG. 5 is a flowchart depicting the recovery of completed transaction information during a boot cycle in accord with the present invention.

One embodiment of the present invention is shown in FIGS. 2 & 3. In the embodiment shown, the system includes a computer 10' with RAM 20 partitioned into two different regions. The first memory region 40 is directly accessible to the operating system and is typically initialized or modified during a boot cycle. A device driver 28' handles read requests 50 and write requests 52 from the operating system 26 directed to the second memory region 42. One skilled in the art would recognize that a device driver can be replaced by other intermediary programs that provide the same functionality. A modified BIOS 30' prevents the operating system 26 from directly accessing the contents of the second memory region 42. The second memory region 42 is not directly accessible to the operating system 26 and therefore is not modified or initialized during a boot cycle. In one embodiment of the present invention, configuration information 44 regarding the location and size of the second memory region 42 is stored in an entry in NVRAM 24.

Referring again to FIG. 1, during a normal boot operation a computer 10 typically invokes a BIOS 30 that typically provides low-level access to peripherals; identifies RAM 20 available to the processor 12; initializes this RAM 20, typically destroying its contents; and then installs the operating system 26 into RAM 20, giving the operating system access to the entire RAM 20 to move information into and out of memory as necessary. If the computer 10 is started after having been powered down, all of its memory will have been initialized.

In contrast, referring to FIG. 2, during a normal boot operation a computer 10' constructed in accordance with the present invention invokes a modified BIOS 30.' The modified BIOS 30' retrieves configuration information 44 from NVRAM 24. This configuration information 44 includes the start address and the size of persistent memory. If both these values are zero or non-existent, then the modified BIOS 30' knows that the invention is either not installed or disabled. If the size is non-zero, but the start address is zero, then the start address is recalculated by subtracting the size of the persistent memory from the total memory size and storing this result as the new start address.

The modified BIOS 30' then divides the RAM 20 into two memory regions: a first non-persistent memory region 40 ranging from address 0 up to, but not including, the persistent memory start address, and a second persistent memory region 42 consisting of all memory from the persistent memory start address up to, but not including, the sum of the persistent memory start address and the persistent memory size. The system then initializes the first memory region 40. The modified BIOS 30' still provides low-level access to peripherals, but installs the operating system 26 into the first memory region 40 of RAM 20, and preventing the operating system 26 from directly accessing the second memory region 42 during the boot cycle and normal computer operation. The operating system 26 is, in effect, unaware of the second memory region 42. The operating system 26 typically initializes or installs its own programs into the first memory region 40, often modifying the contents of the first memory region 40, but does not modify the contents of the second memory region 42 of which it is unaware. This renders the contents of the second memory region 42 persistent through a boot cycle.

Typically the operating system 26 will load device drivers 28 to permit access to various peripheral devices. Referring again to FIG. 3, in one embodiment of the present invention the operating system 26 loads a device driver 28' that is aware of the second memory region 42 and is able to access its contents. The device driver 28' is aware of the second memory region 42 because it is also aware of and accesses the configuration information 44 stored in NVRAM 24. After loading the configuration information 44, the device driver 28' serves as an intermediary between the operating system 26 and the second memory region 42. The device driver 28' takes a read request 50 from the operating system 26 and returns information from the appropriate location in the second memory region 42. Similarly, the device driver 28' takes a write request 52 from the operating system 26 and stores information at the appropriate location in the second memory region 42. In another embodiment, an intermediary program installs and configures the invention, and then invokes operating-system level functionality to enable the operating system to access this second set of memory regions only after the boot cycle is completed.

For example, in one embodiment of the invention the operating system 26 is the Windows 2000 operating system. Under Windows 2000, the second memory region 42 accessible through the device driver 28 appears to the operating system 26 as a RAM disk, though the contents of a normal RAM disk do not survive a boot cycle, in contrast to the present invention. A Windows 2000 read request 50 or write request 52 includes a offset value (in bytes) and a length value (in bytes). The device driver 28' computes the appropriate location in the second memory region 42 by adding the offset value in the request to the start address of the persistent memory region. In one embodiment, the second memory region 42 includes 1 MB of configuration information, so the appropriate location is actually the sum of the offset value, the start address of the persistent memory, and 1 MB. For a read request 50, the device driver 28 copies a number of bytes equal in size to the length value from the computed location in the second memory region 42 to the user's buffer. For a write request 52, the device driver 28 copies a number of bytes equal in size to the length value passed by the operating system 26 from the user's buffer to the computed location in the second memory region 42. This interaction permits the operating system 26 to indirectly access the second memory region 42 without threatening the integrity of the contents of the second memory region 42 during a boot cycle. In another embodiment where Windows 2000 is the operating system 26, the device driver 28' invokes the functionality of the operating system 26 to map the computed location onto the virtual address space of the operating system 26 for the copy operation. Other operating system 26 functionality completes the copy operation and unmaps the computed location from the virtual address space of the operating system 26.

Figure 6:
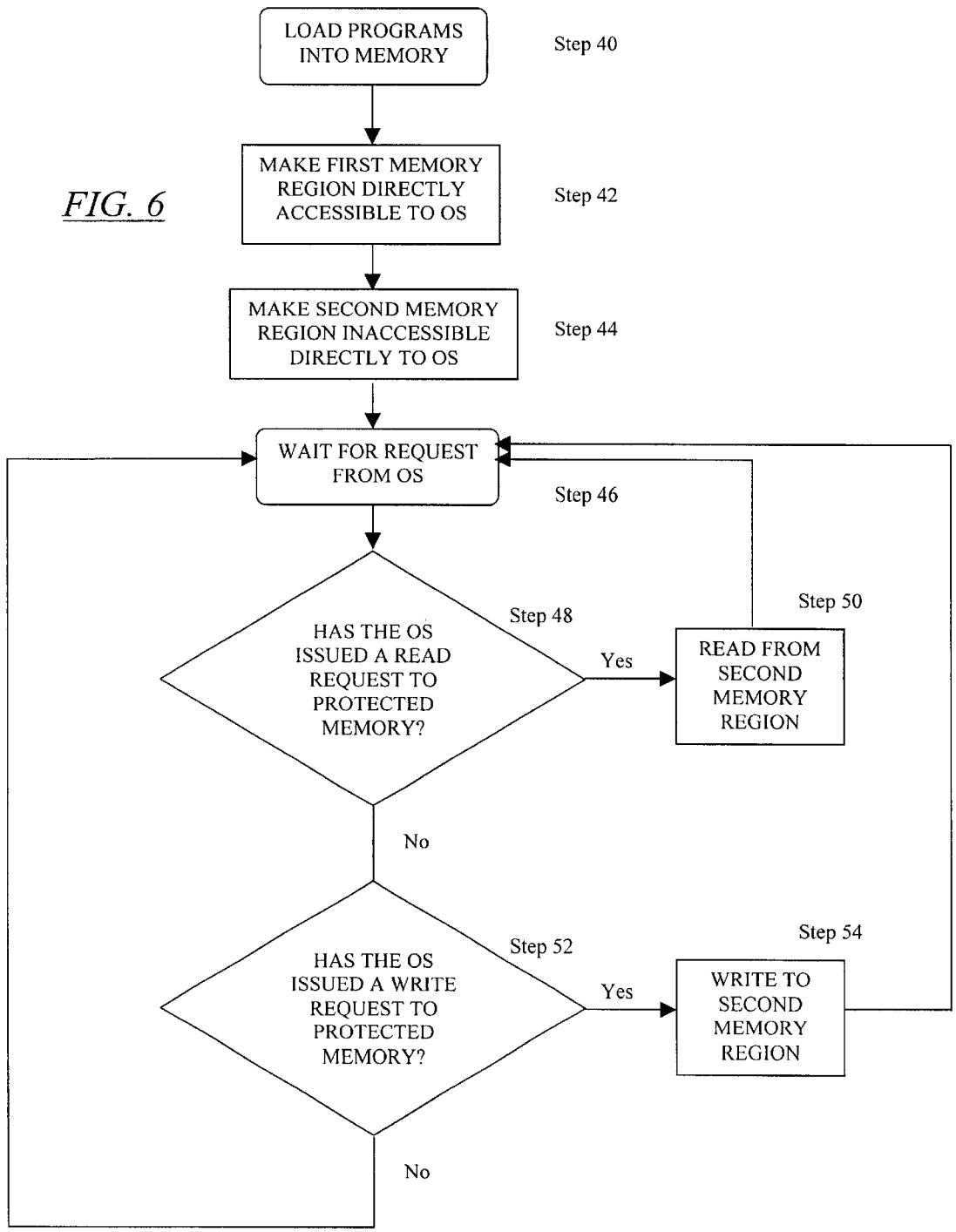
FIG. 6 is a flowchart depicting the operation of an embodiment of the present invention.

Referring to FIG. 6, during a boot cycle the computer loads the programs implementing the invention into memory at Step 40. In one embodiment, the programs are a modified BIOS and a device driver. The programs divide the memory into two portions: a first region directly accessible to the operating system in Step 42 and making a second region that is not directly accessible to the operating system in Step 44. This is accomplished through modifications to the BIOS. The inaccessibility to the operating system renders the contents of the second region resistant to initialization or modification during a boot cycle. Again, one skilled in the art will recognize that the present invention permits multiple persistent and non-persistent memory regions, but for the sake of simplicity of discussion and depiction, the present discussion assumes one persistent memory region and one non-persistent memory region.

Once the memory partitioning has been achieved, a device driver 28' or similar intermediary program provides indirect access to the second memory region 42 to the operating system. In step 46, the device driver 28' waits for a read request 50 or a write request 52 from the operating system 26. The device driver 28' decides (Step 48) whether a read request has been received, and if one has, then the intermediary program reads (Step 50) from the appropriate location in the second memory region 42 and returns the result to the operating system 26. Similarly, if the device driver 28 decides (Step 52) that a write request 52 has been received, then the device driver stores (Step 54) information at the appropriate location in the second memory region 42. If neither type of request has been received, then the device driver returns to step 36 and continues to wait for requests. Typically, read and write requests from the operating system to the first memory region operate as they would have before the installation of the present invention.

In the preferred embodiment, the computer programs comprising the present invention are on a magnetic disk drive and selecting an icon invokes the installation of the programs, initializing the present invention. In general, the programs implement the invention on the computer, and the programs either contain or access the data needed to implement all of the functionality of the invention on the computer.

Figure 7:
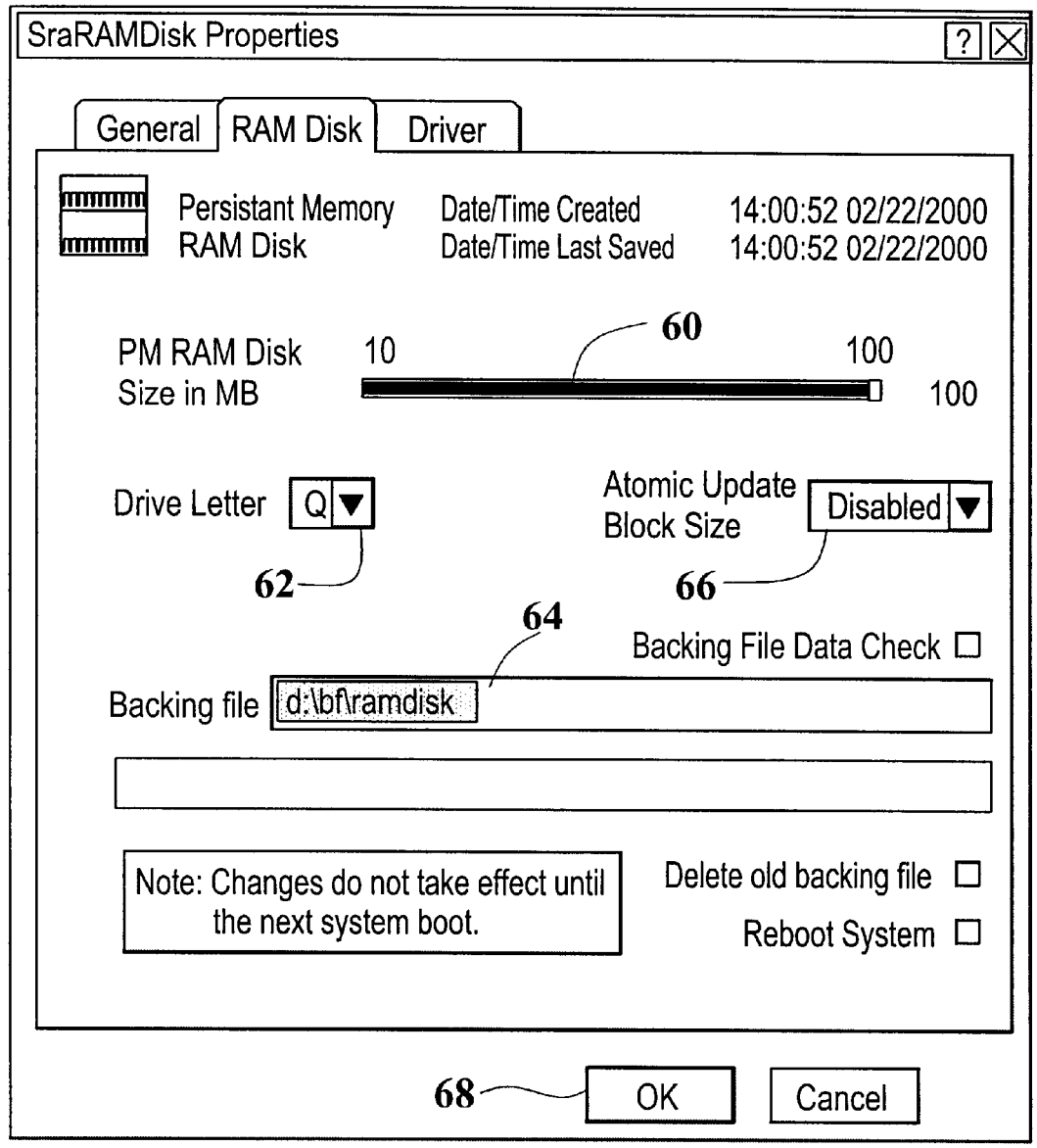
FIG. 7 is an embodiment of an interface presented to the user to solicit information for the configuration of the present invention.

Referring to FIG. 7, the user is prompted to configure the invention prior to its installation with a user interface. In one embodiment, this prompt takes the form of a dialog box, though other forms of prompting are feasible, typically including asking the user a series of questions or requiring the user to manually edit a configuration file. The dialog box typically permits the user to choose the size of the persistent memory and choose a designation through which the operating system accesses it. This configuration information provided by the user is stored in non-volatile storage, such as NVRAM 24 or as a file entry in a mass storage device 32. In a preferred embodiment, a dialog box includes a slider element 60, a pop-up menu element 62, and a text-entry element 64. The slider element 60 permits the user to select the size of the persistent memory. For example, the slider element 60 permits the user to select a persistent memory from 10 to 100 MB in size in 10 MB increments. Of course, particular numerical values may vary between implementations. The pop-up menu element 62 permits the user to assign a drive letter to the device driver 28' to permit the operating system to address it. The text-entry element 64 permits the user to designate a file name for the backing store file. A pop-up menu element 66 permits the user to designate the transaction size for the atomic update feature described above. When the user has entered the configuration information, the user selects the OK button 68 which initiates the embodiment of the present invention in the computer. The invention is installed and typically becomes effective after the next boot cycle. In one embodiment the present invention is implemented in RAM, but it may also be implemented in a storage-based virtual memory system or some other memory apparatus.

Referring back to FIG. 1, the present invention may be deployed to improve the operation of redundant mass storage 32 elements in the computer 10. For example, redundant mass storage elements may be provided as RAID level 1 disk arrays, RAID level 5 disk arrays, or other mass storage element configured to provide RAID level 1 or RAID level 5 type functionality. Some current methods require copying, after a system failure, of one disk in a RAID level 1 disk array in its entirety to the other disks in the array. Other methods use parity information to reconstruct the data (RAID level 5). Resynchronization of the RAID device after system failure monopolizes system resources as the resynchronization occurs. In contrast, the persistent volatile memory of the present invention enables the creation of a list of write transactions resistant to system failures. After a failure, recovery need only involve the recreation of data using the transactions in the list stored in persistent memory.

Figure 8:
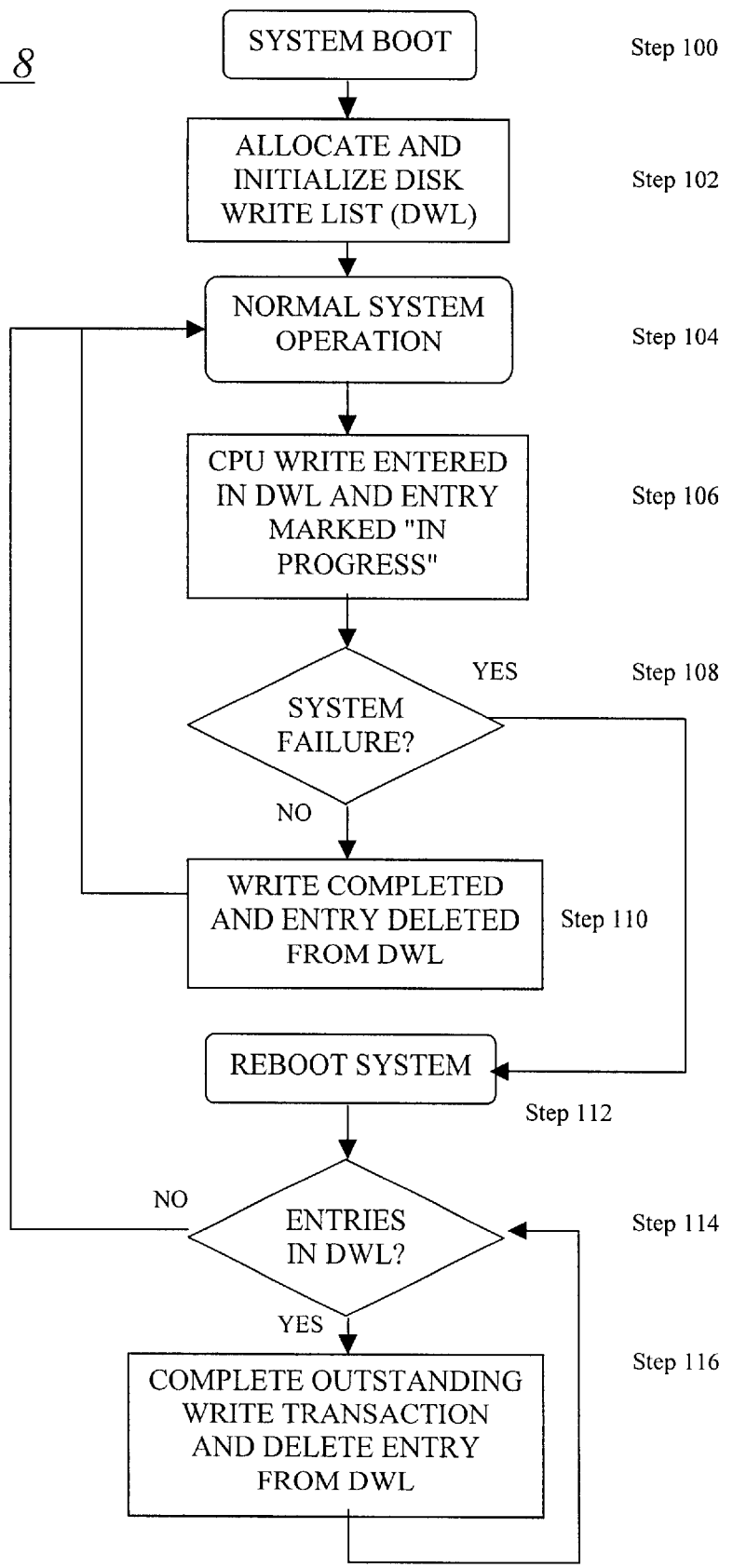
FIG. 8 is an flowchart describing the operation of an embodiment of the invention directed to the contents of non-volatile storage.

Referring to FIG. 8, at system boot (Step 100) the computer follows the process described above to create two regions of volatile memory: a non-persistent memory region that is directly accessible to the operating system and typically is initialized or modified during a boot cycle, and a persistent memory whose contents are not initialized or modified during a boot cycle. Next, a disk write list is created in persistent memory (Step 102). The amount of persistent memory allocated for the disk write list can vary with system configuration, but typically is at least one page (4 kb) in size. The disk write list is used to store a list of pending write transactions posted to mass storage.

In normal system operation, (Step 104) the system typically runs an operating system and various programs. Some of these programs are application programs, which provide the operator of the system with various functionalities utilizing the system, while other programs provide the system itself with additional functionality. Referring to FIG. 1, an example of the latter is a device driver 28, which permits the operating system 26 to access various peripherals.

The present invention uses a specialized device driver 28 that permits the operating system 26 to access mass storage 32, which is, in some embodiments, a RAID array. Referring to FIG. 8, during normal system operation the CPU will typically issue a write request to mass storage via the specialized device driver. The device driver records this write transaction in the disk write list in persistent memory and marks the transaction "in progress" (Step 106). The entry in the disk write list includes the start address for the write, the length of the data to be written, the mass storage volume identifier for the write being performed, and the status of the transaction as "in progress." Then the device driver attempts to complete the posting of the contents of the write transaction to a start address in mass storage. Under normal circumstances there is no system failure during the transaction (Step 108), the write is successfully completed, and the device driver deletes the now-completed entry in the disk write list (Step 110). In other embodiments, upon successful completion of a mass storage with the entry in the write list is marked "complete." Normal system operation continues (Step 104).

In the event of system failure (Step 108), the system will need to be rebooted (Step 112). Upon reboot, the operating system through the device driver checks for entries in the disk write list in persistent memory (Step 114). If the disk write list has no entries in it, the system proceeds to normal system operation (Step 104).

If the disk write list has entries in it, then the operating system processes each entry in the disk write list. For each entry, the operating system assumes that the system failure (Step 108) occurred during the write transaction, and proceeds to complete the posting to the storage volume identified in the entry. In embodiments where the storage volume is a RAID level 1 device, the system reads data from the start address equal in length to the length in the disk write list from the primary disk and writes it to the secondary disks in the array. In embodiments where the storage volume is a RAID level 5 device, the system reads the data from all of the data volumes at the specified location in the specified length and reconstructs the corresponding parity data.

When the outstanding transaction is completed, the entry in the disk write list corresponding to the completed transaction is deleted (Step 116). The process continues for each entry in the disk write list (Step 114). When all the "in progress" transactions in the disk write list have been completed, normal system operation resumes (Step 104).

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustration.

What is claimed is:

1. A computer operating under control of an operating system, the computer comprising:
    a non-volatile storage device;
    a volatile memory including a first, contiguous, non-persistent memory region, directly accessible by the operating system and initialized during a boot cycle, and a second, contiguous persistent memory region not directly accessible by the operating system and not initialized during a boot cycle, and
    an intermediary program in communication with the operating system and the second, persistent memory region,
    wherein the intermediary program enables the operating system to address the second, persistent memory region to store in the second, persistent memory region of the volatile memory a list of write transactions posted to the non-volatile storage device.

2. The computer of claim 1 wherein the non-volatile storage device is a redundant array of inexpensive disks (RAID array).

3. The computer of claim 1
    wherein, in the event of a system failure, the operating system repairs the contents of the non-volatile storage device by reading the list of write transactions stored in said second, contiguous persistent region of the volatile memory and completing the write transactions read from the list.

4. A storage medium having computer-readable program means embodied thereon which, when loaded into a computer having an operating system, a first, contiguous, non-persistent memory region and a second, contiguous persistent memory region, and a non-volatile storage device, provides the computer with improved recovery from system failures, said program comprising:
  (a) computer-readable program means for intercepting write transactions directed to the non-volatile storage device;
  (b) computer-readable program means for storing the write transaction as an entry in the second, contiguous persistent memory region of the volatile memory; and
  (c) computer-readable program means for writing the write transaction to the non-volatile storage device.

5. The storage medium of claim 4 further comprising:
  (d) computer-readable program means for identifying the write transaction stored in the second, contiguous persistent memory region of the volatile memory "completed" upon the successful completion of step (c).

6. In a computer system comprising an operating system, an intermediary program, a non-volatile storage device, and a volatile memory element proportioned into a first, contiguous non-persistent memory region and a second contiguous persistent memory region, a method for providing improved recovery from system failures, the method comprising the steps of:
  (a) intercepting a write transaction from the operating system;
  (b) storing the write transaction as an entry the in second, persistent region of the volatile memory;
  (c) reading the write transaction from the second, persistent region of the volatile memory relevant; and
  (d) writing the write transaction to the non-volatile storage device.

7. The method of claim 6 additionally comprising the step:
  (e) marking the write transaction stored in the persistent region of the volatile memory element "completed" following the successful completion of step (d).

8. In a computer system comprising an operating system, a device driver, a persistent volatile memory partitioned into a first, contiguous non-persistent region and a second, contiguous, persistent region containing the stored contents of write transactions directed to a non-volatile storage device, a method for providing improved recovery from system failures, the method comprising the steps of:
  (a) selecting write transactions stored in the second, persistent region of volatile memory marked uncompleted;
  (b) reconstructing information related to the uncompleted write transactions
  (c) completing the transaction; and
  (d) marking the uncompleted write transactions as completed after the successful completion of step (c).

9. The computer of claim 1 wherein the first, non-persistent memory region and the second, persistent memory region comprise different physical volatile memory elements.

10. The computer of claim 1 wherein the intermediary program comprises a device driver.

11. The computer of claim 1 additionally comprising a basic input/output system (BIOS) preventing direct access to the second, persistent memory region by the operating system.

12. The computer of claim 1 additionally comprising a non-volatile memory element storing information concerning the configuration of the second, persistent memory region.

* * * * *